United States Patent [19]
Takeda et al.

[11] Patent Number: 5,419,743
[45] Date of Patent: May 30, 1995

[54] LOW NOISE CHAIN DRIVE

[75] Inventors: Hiroyuki Takeda; Tetsuji Kotera, both of Nabari, Japan

[73] Assignee: Borg-Warner Automotive K.K., Nabari, Japan

[21] Appl. No.: 155,436

[22] Filed: Nov. 19, 1993

[30] Foreign Application Priority Data

Nov. 20, 1992 [JP] Japan ................................. 4-312161

[51] Int. Cl.6 ............................................. F16H 7/06
[52] U.S. Cl. ................... 474/157; 474/210; 474/215
[58] Field of Search ............... 474/206, 210, 213–215, 474/155–157

[56] References Cited

U.S. PATENT DOCUMENTS

| | | | |
|---|---|---|---|
| 4,342,560 | 8/1982 | Ledvina et al. | 474/157 |
| 4,759,740 | 7/1988 | Cradduck | 474/213 X |
| 4,854,925 | 8/1989 | Chandrupatla | 474/214 X |
| 5,267,909 | 12/1993 | Iacchetta | 474/206 |
| 5,267,910 | 12/1993 | Maruyama et al. | 474/212 |

FOREIGN PATENT DOCUMENTS 2-118231   5/1990   Japan .
4-136345  12/1992   Japan .

*Primary Examiner*—Roger J. Schoeppel
*Attorney, Agent, or Firm*—Willian Brinks Hofer; Greg Dziegielewski

[57] ABSTRACT

A low noise chain drive of this invention includes toothed sprockets and an endless silent chain having sets of link plates successively connected for articulation by means of connecting members. Each set has a plurality of transversely aligned link plates with each having a pair of link plate teeth designed to engage the sprocket and a pair of openings through which the connecting members are inserted. The link plate teeth are defined by an outside flank and an inside flank. The sprocket has sprocket teeth defined by a sprocket tooth flank.

The sprocket tooth flanks and the outside flanks are profiled such that the outside flanks have a swelling located between the tip of the link plate tooth and a point that is in contact with the sprocket tooth after the completion of the engagement. The swellings are formed such that when one link plate set rotates around a rotational axis relative to the preceding set having completed the engagement with the sprocket, the swellings of the one link plate set project outwardly from a circle defined by the minimum radius centering on the rotational axis and osculating the sprocket tooth flank to be meshed with the outside flank located on the trailing side of the one link plate set. The link plate teeth stay in sliding contact at their outside flanks with the sprocket teeth from the beginning of their engaging process through its completion to thereby ease engagement impacts and noises.

14 Claims, 8 Drawing Sheets

LOW NOISE CHAIN DRIVE

The present application claims priority under 35 U.S.C. § 119 from Japanese Patent Application No. 4-312161 filed Nov. 20, 1992, the entire disclosure of which is incorporated herein by reference.

BACKGROUND OF THE INVENTION

This invention pertains to a chain drive using a silent chain and in particular to a low noise chain drive composed of a silent chain and a plurality of toothed sprockets cooperating therewith. The silent chain has link plate sets successively connected for articulation by means of connecting members. Each set has a plurality of transversely aligned link plates with each having a pair of link plate teeth designed to engage the sprockets.

A conventional silent chain drive is shown in Japanese Laid-Open Patent Application No. 2-118231, in which link plate teeth have outside flanks each defined by an arcuate surface with the center consistent with the rotational axis of the link plate so that the outside flanks come in sliding contact with the sprockets to ease impacts and thereby lower noises from the chain drive.

Inevitably, however, when the outside flanks of the link plates and the sprocket tooth flanks of the sprockets are machined, there are flaws or imperfections usually in their profiles. These imperfections could hamper smooth sliding contact between the link plate teeth and the sprocket teeth and cause noise. Even if machined precisely, the link plate teeth and the sprocket teeth are subject to wear during the course of operation and eventually make noise.

A conventional silent chain drive of another type is shown in Japanese Laid-Open Patent Application No. 57-22443. In this design, a chain consists of two different kinds of link plate sets: link plates in some sets have inside flanks designed to engage the sprocket teeth and link plates in the other sets have outside flanks defined by a substantially straight surface coming into driving contact with the sprocket teeth. These two kinds of link plate sets are arranged randomly in the chain in order to randomize engaging timing with sprockets to reduce noises, especially pitch noises. Random arrangement of the different link sets is effective in reducing pitch noises but may not be as effective in easing impacts and, therefore, may not be as effective in reducing the overall noise level of the chain drive. Also, the link plates that contact the sprocket at their inside flanks are subjected to stress concentration at their crotches and may have a lower fatigue strength.

It is therefore an object of this invention to provide a low noise chain drive with link plate teeth and sprocket teeth of improved profiles that enable the link plate teeth to stay in sliding contact at their outside flanks with the sprocket teeth from the beginning of their engaging process through their completion and, after the completion of the engagement, remain stationary with respect to the sprocket teeth in order to ease engagement impacts.

Other objects of the invention will become apparent to one skilled in the art upon consideration of the following description and the accompanying drawings.

SUMMARY OF THE INVENTION

In one embodiment, a low noise chain drive of this invention comprises toothed sprockets and an endless silent chain having sets of link plates successively connected for articulation by means of connecting members. Each set has a plurality of transversely aligned link plates with each plate having a pair of teeth designed to engage the sprocket and a pair of openings through which the connecting members are inserted. The teeth are defined by an outside flank and an inside flank.

The sprocket has teeth defined by sprocket tooth flanks. The sprocket tooth flanks and the outside flanks are profiled such that the outside flanks have a swelling located between the tip of the link plate tooth and a point that is in contact with the sprocket tooth after the completion of the engagement. The swellings are formed such that when one link plate set rotates around a rotational axis relative to the preceding set having completed the engagement with the sprocket, the swellings of the one link plate set project outwardly from a circle defined by the minimum radius centering on the rotational axis and osculating the sprocket tooth flank to be meshed with the outside flank located on the trailing side of the one link plate set.

Another embodiment of this invention comprises toothed sprockets and an endless silent chain having sets of link plates successively connected for articulation by connecting members. Each set has a plurality of transversely aligned link plates with each having a pair of teeth designed to engage the sprocket and a pair of openings through which the connecting members are inserted. The link plate teeth are defined by an outside flank and an inside flank.

The sprocket has sprocket teeth defined by sprocket tooth flanks. The sprocket tooth flanks and the outside flanks are profiled such that the outside flanks in some link plate sets have a swelling located between the tip of the link plate tooth and the point that is in contact with the sprocket tooth after the completion of the engagement. The swellings are formed such that when one link plate set rotates around a rotational axis relative to the preceding set having completed the engagement with the sprocket, the swellings of the one link plate set project outwardly from a circle defined by the minimum radius centering upon the rotational axis and osculating the sprocket moth flanks to be meshed with the outside flanks located on the trailing side of the one link plate set. The outside flanks in other link plate sets are defined without the swelling. The link plate sets with the swellings and the other link plate sets without the swellings may be arranged randomly in the chain.

In this embodiment, since the sets without the swellings do not come into contact with the sprocket teeth, the overall noise level of the drive as well as the pitch noises are reduced due to randomization of impact timing between the chain and the sprockets.

Another embodiment of this invention comprises toothed sprockets and an endless silent chain having sets of link plates successively connected for articulation by connecting members. Each set has a plurality of transversely aligned link plates with each having a pair of link plate teeth designed to engage the sprocket teeth and a pair of openings through which the connecting members are inserted. The link plate teeth are defined by an outside flank and an inside flank.

The sprocket has sprocket teeth defined by sprocket tooth flanks. The sprocket tooth flanks and the outside flanks are profiled such that the outside flanks in some link plate sets have a swelling located between the tip of the link plate tooth and the point that is contact with the sprocket tooth after the completion of the engagement. The swelling is formed such that when one link plate set rotates around a rotational axis relative to the preceding set having completed the engagement with the sprocket, the swellings of the one link plate set project outwardly from a circle defined by the minimum radius centering the rotational axis and osculating the sprocket tooth flank to be meshed with the outside flank located on the trailing side of the one link plate set. The outside flanks in other link plate sets are defined without the swelling. The link plate sets with the swellings and the other link plate sets without the swellings are arranged randomly in the chain.

The inside flanks in some link plate sets are defined such that a pitch $P_2$ between the inside flanks of two adjacent link plates located in a straight line position of the chain is approximately equal to or greater than a pitch $P_3$ between the inside flanks of the two adjacent link plates located in a chordal position of the chain wound around the sprocket which is approximately equal to or greater than a pitch $P_1$ on a working pitch line between the outside flanks of one link plate. In other words, the pitches $P_1$, $P_2$, and $P_3$ have the following relationship:

$$P_2 > P_1 > P_3$$

During the course of the engaging process between the link plate teeth of the above-described embodiment of the silent chain and the sprocket teeth, the swellings located on the outside flanks in the vicinity of the tips at first come into contact with the sprocket teeth at the beginning of the engaging process and keep in sliding contact with them through the completion of the engaging process and then come out of contact with them after completing the engagement. As a result, the engagement impacts between the chain and the sprockets are eased.

As pointed above, the outside flanks of the link plate teeth stay in contact with the sprocket teeth until the completion of the engagement. In other words, the link plate teeth and the sprocket teeth have a dimensional relationship that interferes their kinetic movements with respect to each other. This relationship assures sliding contact between them even after they have undergone some wear. The rotatable connection between adjacent link plate sets gives them two-dimensional kinetic freedom which enables sliding contact between the link plate teeth and the sprocket teeth under such engaging relationship. Also, there are gaps between connecting members and link plate holes through which the connecting members are inserted. Those gaps also help the sliding contact between them.

In addition, not only do the outside flanks but also the inside flanks have an engaging relationship with the sprocket teeth at the beginning of their engagement. Therefore, engagement impacts are eased by way of sliding contact of both outside and inside flanks, and noises are reduced. Moreover, since impact load is shared by both outside and inside flanks, the chain becomes more durable.

In the chain drive design in which the link plate sets with both outside and inside flanks come into contact with the sprocket teeth and the link plate sets with only outside flanks come into contact with the sprocket teeth are arranged randomly in the chain, impact timing is more randomized. Thus, the noise spectra become closer to white noise, and the peaks of the pitch noises become lower.

DETAILED DESCRIPTION OF THE INVENTION AND PREFERRED EMBODIMENTS

The preferred embodiments of this invention will hereinafter be explained with reference to the attached drawings.

Figure 1:
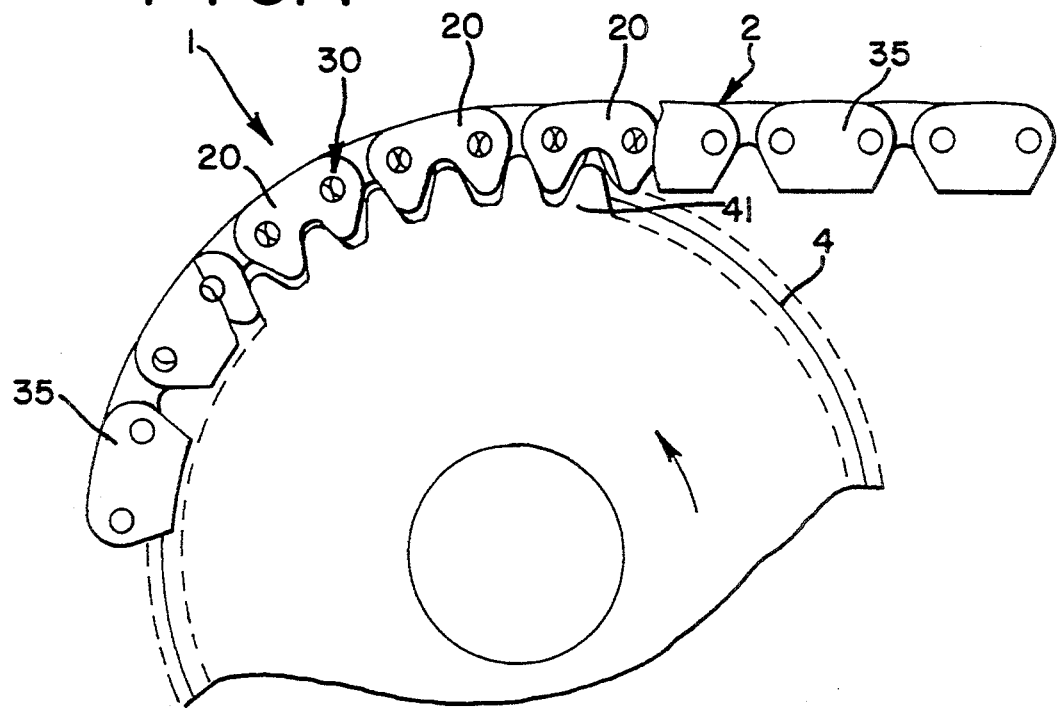
FIG. 1 is a fragmentary side view of a silent chain drive of this invention illustrating a portion of the chain and a portion of a sprocket.
Figure 2:
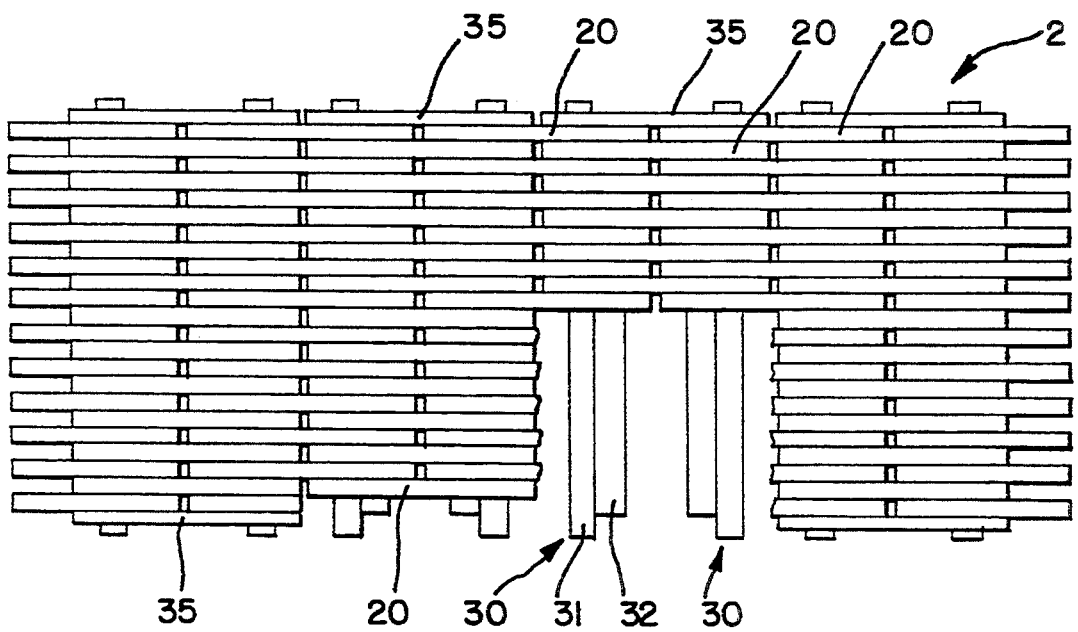
FIG. 2 is a fragmentary top plan view of the silent chain shown in FIG. 1 with a portion cut-away to illustrate one embodiment of a connecting member.
Figure 3:
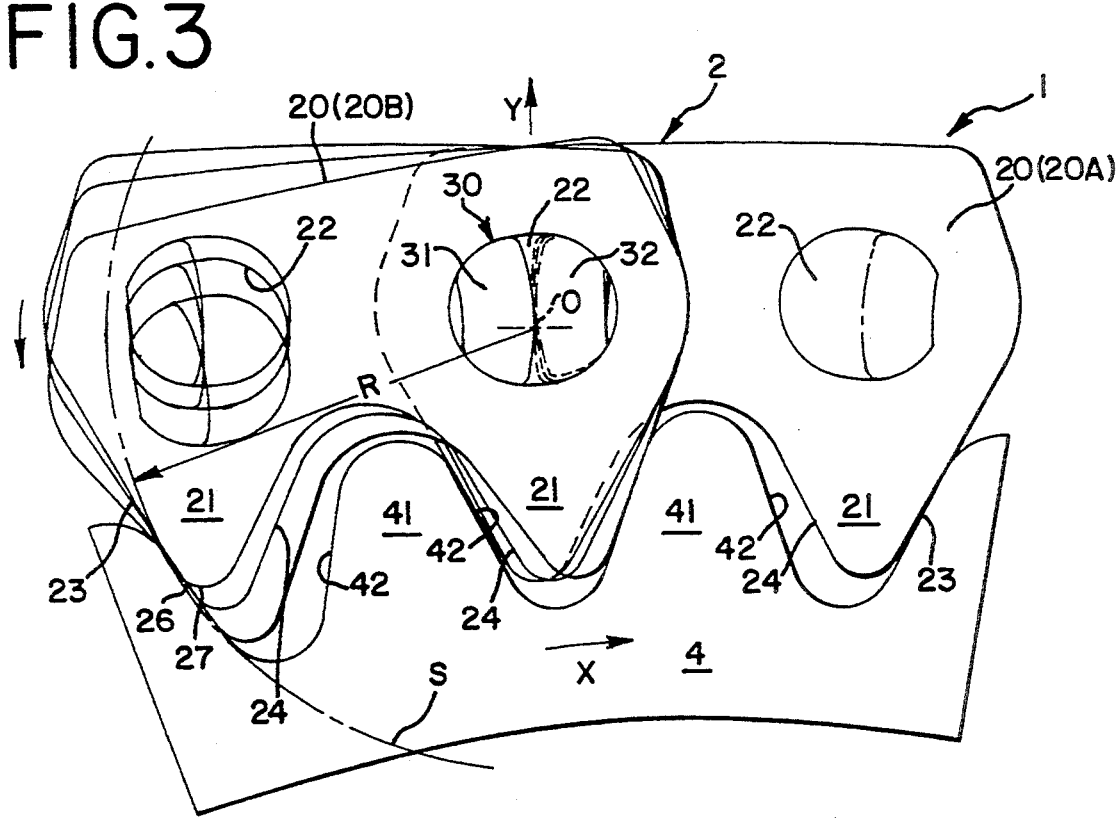
FIG. 3 is a fragmentary enlarged view of the silent chain drive shown in FIG. 1 that illustrates articulation of one link set.

FIGS. 1-3 show one embodiment of the chain drive of the present invention. As shown in those three figures, a chain drive 1 has a silent chain 2 and a plurality of toothed sprockets 4 around which the silent chain 2 is engaged. The silent chain 2 has link plates 20 with each having a pair of teeth 21 and a pair of holes 22, as shown in FIG. 3. The link plates are transversely aligned to each other to compose link plate sets, which are then successively connected for articulation by connecting members 30 inserted through the holes 22 to compose the endless silent chain 2, as shown in FIG. 2.

Figure 5:
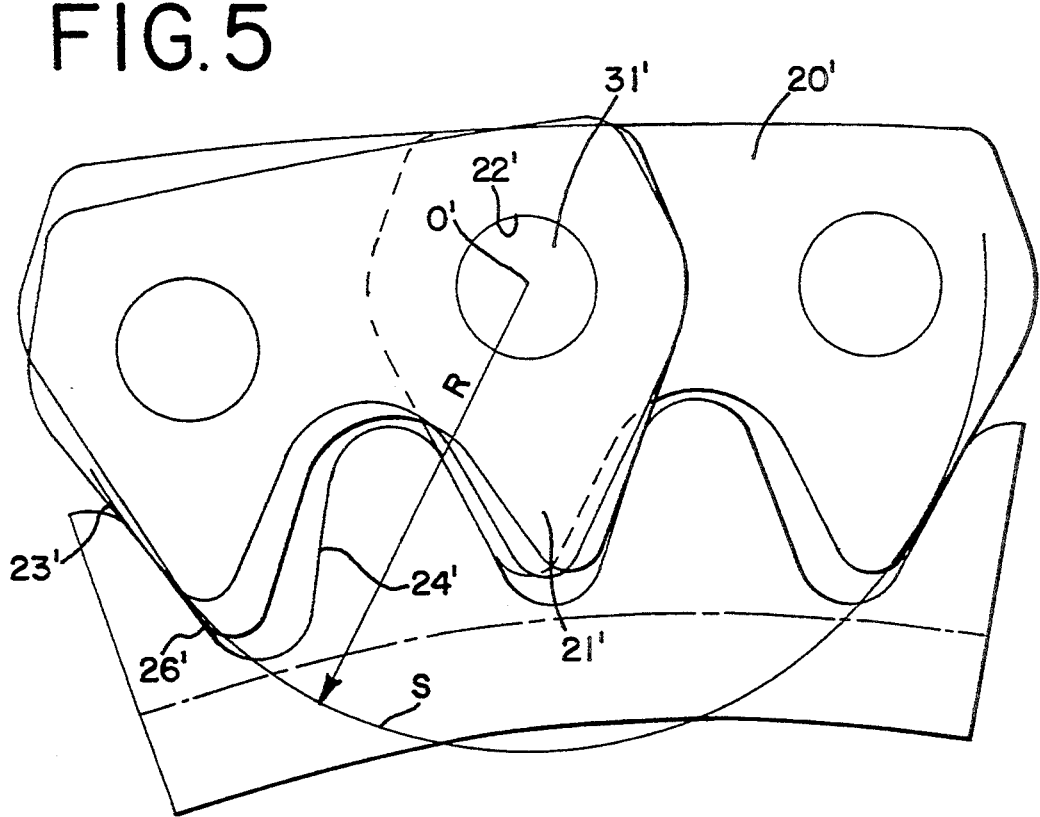
FIG. 5 is a fragmentary view of the silent chain drive having connecting members of a round cross-section.

The link plates 20 have teeth 21 defined by an outside flank 23 and an inside flank 24. The connecting members 30 are conventional rocker joints each consisting of a pair of rocker joint pins 31 and 32. Some link plate sets have guide links 35 attached to their sides. In this way, guide link rows are defined. Other link plate sets do not have any guide links and therefore nonguide link rows are defined. The sets with the guide links and the sets without guide links are arranged alternately in the longitudinal direction of the chain. The guide link may be interposed in the middle of the set, instead of being attached to the sides. One pin of the rocker pin pair is press-fitted at its ends into holes 36 formed in the guide links 35. Please also note that round pins 31' may be employed as connecting members, as shown in FIG. 5.

The profile of the outside flanks 23 and the inside flanks 24 of the teeth 21 of the link plates 20 are substantially straight surfaces. To mesh with so profiled tooth flanks, the sprocket 4 has a plurality of sprocket teeth 41 with sprocket tooth flanks 42 each defined by an involute curve. That is, each sprocket tooth 41 has an involute tooth profile.

Figure 4:
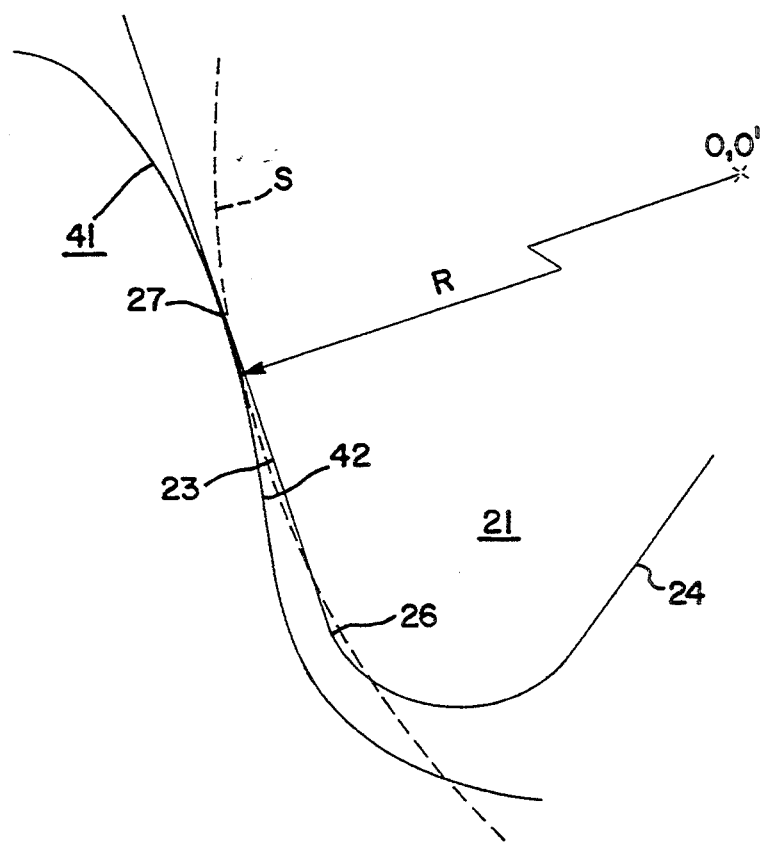
FIG. 4 is a fragmentary enlarged view of the silent chain drive shown in FIG. 3, specifically showing a swelling projecting from an osculating circle.

As best seen in FIGS. 3 and 4, the outside flanks of the link plate teeth 21 of the link plates 20 have a swelling 26 located between the tip and a point (27 in FIG. 3) which is in contact with a sprocket tooth 41 after the completion of the engagement. The swelling 26 is formed such that when one link plate set (a link plate set 20B in FIG. 3) rotates around the connecting member 30 relative to the preceding set (a link plate set 20A in FIG. 3) which has completed engagement with the sprocket. The swelling 26 projects outwardly from a circle S defined by the minimum radius R centering upon the connecting member 30 and osculating the sprocket tooth flank of the sprocket tooth to be meshed with the outside flanks located on the trailing side of the link plate set (20B). If the connecting member is a rocker joint as shown in FIG. 3, the center of the minimum circle S is located at the point O at which a pair of rocker pins 31 and 32 are in contact with each other when link plates are in the straight line position of the chain. If the connecting member is a single pin joint 31' of a round cross-section, the center of the minimum circle S is located at the center O' of the pin.

In this embodiment, as the sprocket 4 rotates in the direction shown by the arrow X, the silent chain 2 goes on to engage the sprocket. After the link plate set 20A completes the engagement with the sprocket and becomes still relative to the sprocket, the link plate set 20B begins to rotate around the connecting member 30, which is common to both the sets 20A and 20B, relative to the link plate 20A. The swellings on the outside flanks 23 of the teeth 21 located on the trailing side of the link plate 20A begin to engage with the sprocket tooth flank 42 of the sprocket tooth 41. When the teeth 21 of the link plate 20 begin to engage the sprocket tooth 41 of the sprocket 4, the swellings 26 on the outside flanks 23 come into contact with the sprocket tooth flank 42 of the sprocket tooth 41. As this engaging process goes on, the link plates 2, as a whole, move in the direction Y within the tolerance determined by the gap between the hole 22 and the connecting member 30, if the degree of the interference between the outside flanks 23 and the sprocket tooth is small, in other words, the size of the swelling 26 is small. If the degree of the interference or the size of the swelling is large, the link plates 2 move in the direction Y, along with the connecting member 30, as the rotation goes on around it. The outside flanks 23 and the sprocket tooth flank 42 of the sprocket 41 keep in with each other during the course of engaging process. Upon completion of the engagement, the outside flanks 23 come into contact with the sprocket tooth flank 42 of the sprocket tooth 41 at the contacting points 27. The outside flanks keep in sliding contact with the sprocket tooth flank 42 of the sprocket 41 from the beginning of the engaging process through its completion. The link plates undergo such an engagement process one by one.

Figure 10:
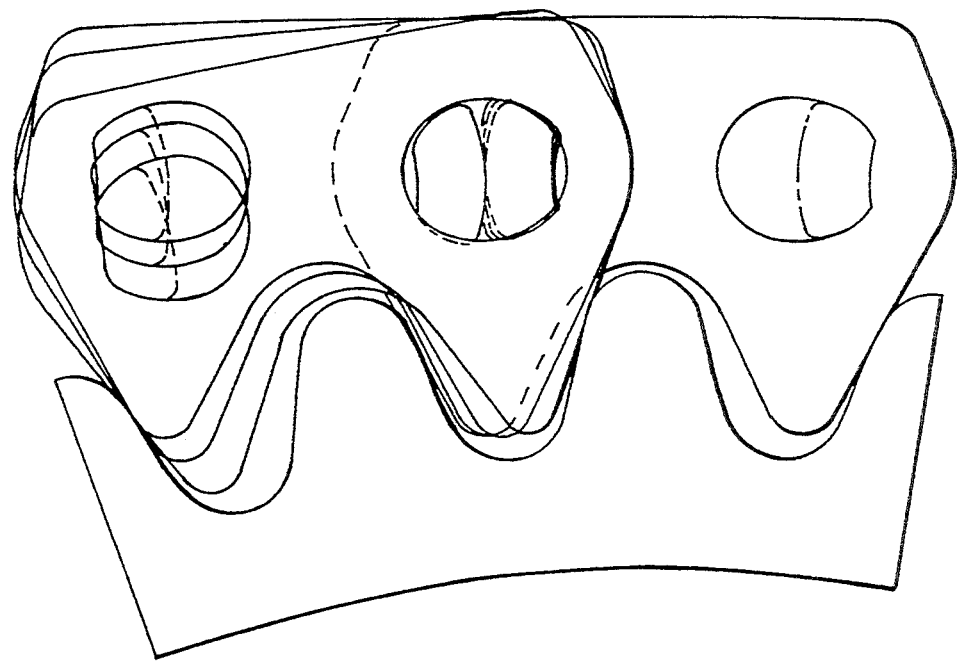
FIG. 10 is a view similar to FIG. 3 but showing a silent chain drive of a conventional type.
Figure 11:
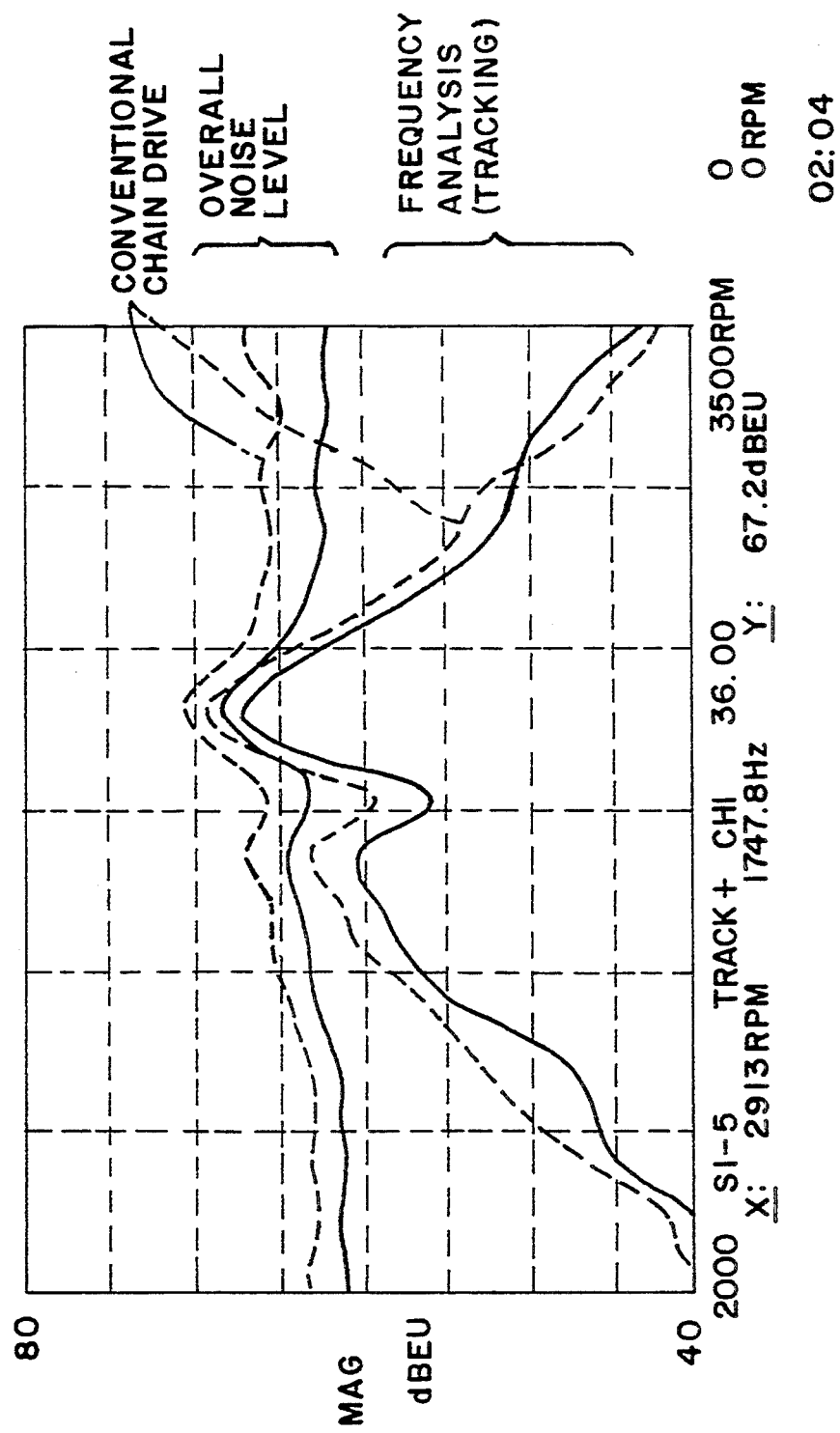
FIG. 11 is a graph comparing noise characteristics between the silent chain drive shown in either FIG. 1 or FIG. 3 and the conventional silent chain drive of FIG. 10.

The above-explained design is effective in easing impacts which occur upon the engagement of the silent chain with the sprocket. FIG. 11 is a graph showing noise characteristics of this embodiment in comparison with those of the conventional chain drive shown in FIG. 10. In FIG. 11, the noise characteristics of this embodiment are depicted by a continuous line. The noise characteristics of the conventional chain drive of FIG. 10 are depicted by a broken line. As clearly shown in this graph, the noise characteristics of this embodiment are improved in terms of both overall noise level and frequency analysis, compared to the conventional drive.

Figure 6:
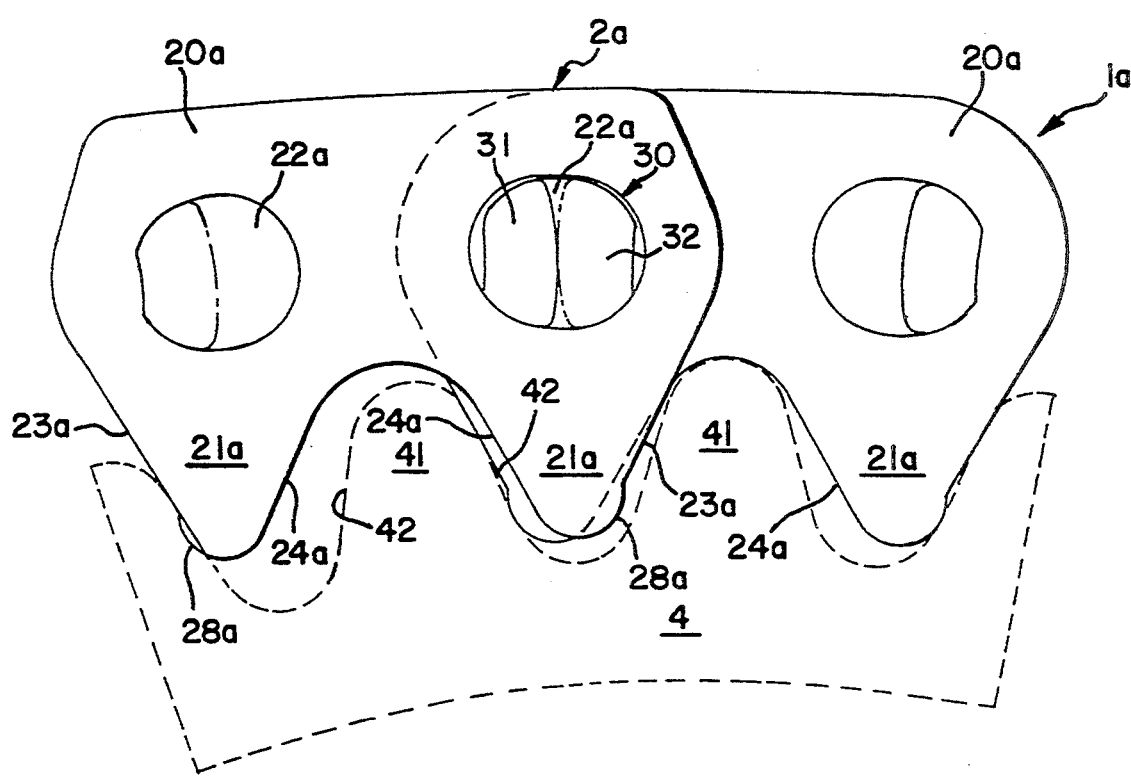
FIG. 6 is a fragmentary enlarged view showing another form of this invention.

FIG. 6 shows the second embodiment of this invention. In this embodiment, a chain drive 1a has a silent chain 2a which has the same function as that of the first embodiment, i.e., during the engaging process between link plate teeth 21a of link plates 20a and the sprocket teeth 41, the outside flanks 23a of the link plates 20a keep in sliding contact with the sprocket tooth flanks 42 of the sprocket teeth 41. The link plates 20a of this silent chain 2a have a pair of teeth 21a. Each tooth has an outside flank 23a with an arcuate swelling 28a formed in the vicinity of the tip. At the beginning of the engagement between the link plate teeth 21a and the sprocket tooth 41, the swellings 28a formed on the outside flank 23a come into contact with the sprocket tooth flank 42 of the sprocket tooth 41 at points close to the tips. During the course of the engaging process, the contacting points with the sprocket tooth flank 42 move along the swellings 28a. Upon completion of the engaging process, the contacting points move away from the swellings 28a to the straight line portions of the outside flanks 23a. At the beginning of the engaging process, as explained with the first embodiment, the link plates move in the direction shown in FIG. 3 according to the degree of interference between the swellings 28a and the sprocket tooth 41.

A silent chain of this invention may be constructed by way of random arrangement of the link plate sets of the above embodiment and link plate sets including a certain number of transversely aligned conventional link plates as shown in FIG. 10 whose outside flanks do not come in contact with the sprocket tooth flanks of the sprocket teeth. In this design (the third embodiment), the overall noise level of the chain drive is lowered. In addition, this design can randomize impact timing of the link plates and thereby lower the peaks of pitch noises.

Figure 7:
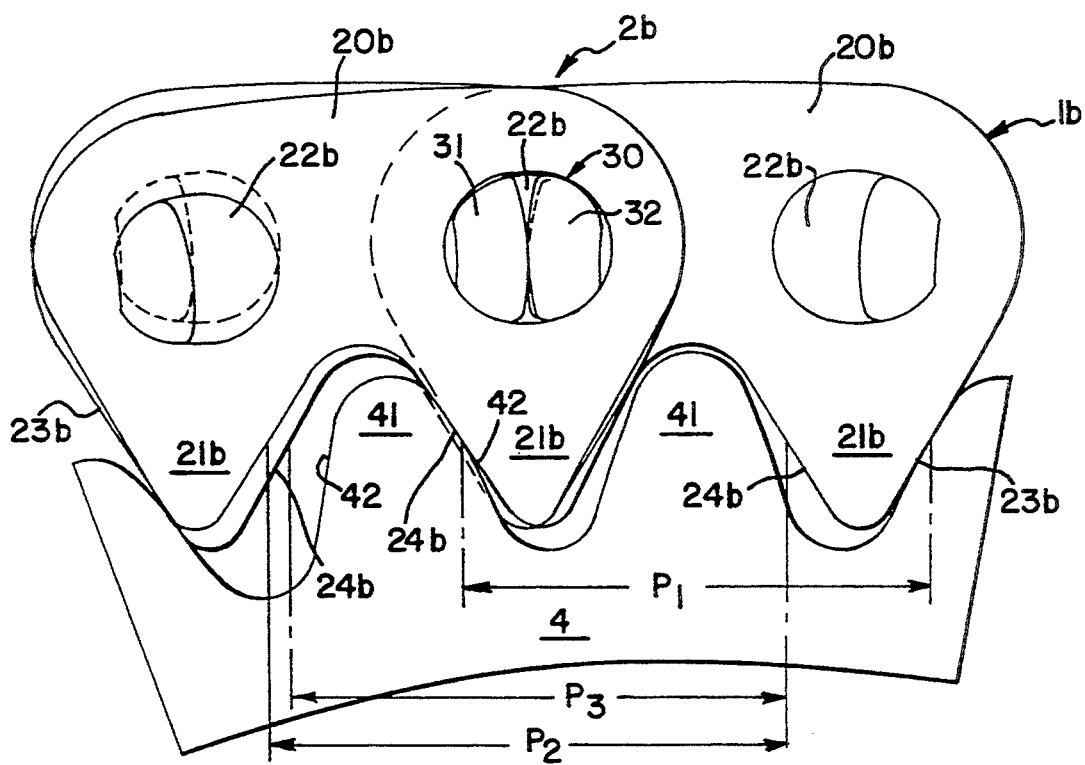
FIG. 7 is a fragmentary enlarged view showing another form of this invention.

FIG. 7 shows the fourth embodiment of this invention. In this embodiment, a silent chain 2b has link plates 20b each having a pair of teeth 21b and a pair of holes 22b. The teeth 21b are defined by an outside flank 23b and an inside flank 24b which are formed such that during the engaging process between the outside flanks 23b of the teeth 21b located on the trailing side of the link plates 20b and the corresponding sprocket tooth flank 42 of the sprocket tooth 41, the outside flanks 23b keep in contact with the sprocket tooth flank 42 from the beginning of the engaging process through its completion, and that at the beginning of the engagement process, the inside flanks 24b of the teeth 21 located on the leading side also come into contact with the corresponding sprocket tooth flank 42 of the sprocket tooth 41. In other words, the outside flanks 23b are formed in the same manner as shown in the first embodiment in relation to the sprocket teeth 41, and the inside flanks 24b are formed in the same manner as disclosed in Japanese Patent Publication hei 1-56304. According to this publication, the inside flanks are formed such that a pitch $P_2$ between the inside flanks 24b of two adjacent link plates 20b located in a straight line position of the chain is approximately equal to or greater than a pitch $P_3$ between the inside flanks in a chordal position of the chain wound around the sprocket 4 which is approximately equal to or greater than a pitch $P_1$ on a working pitch line between the outside flanks pair of one link plate. In other words, the pitches $P$, $P_2$, and $P_3$ have the following relationship:

$$P_2 \geq P_1 P_3$$

In this embodiment, the inside flanks 24b on the link plate teeth (located on the leading side) at first come into contact with the corresponding sprocket tooth flank 42 of the sprocket tooth 41 and then, the outside flanks 23b of the other link plate teeth (located on the trailing side) come into contact with the corresponding sprocket tooth flank 42 of the sprocket tooth 41. In this embodiment, both outside and inside flanks function to ease the engagement impacts and lower noises by virtue of their sliding contact. In addition, since the impact load is shared by both outside and inside flanks, the chain becomes more durable. Like the preceding embodiments, the link plates 20b move in the direction shown in FIG. 3 according to the degree of interference between the outside flanks 23b and the sprocket teeth 41 or the size of the swellings 28a.

Figure 12:
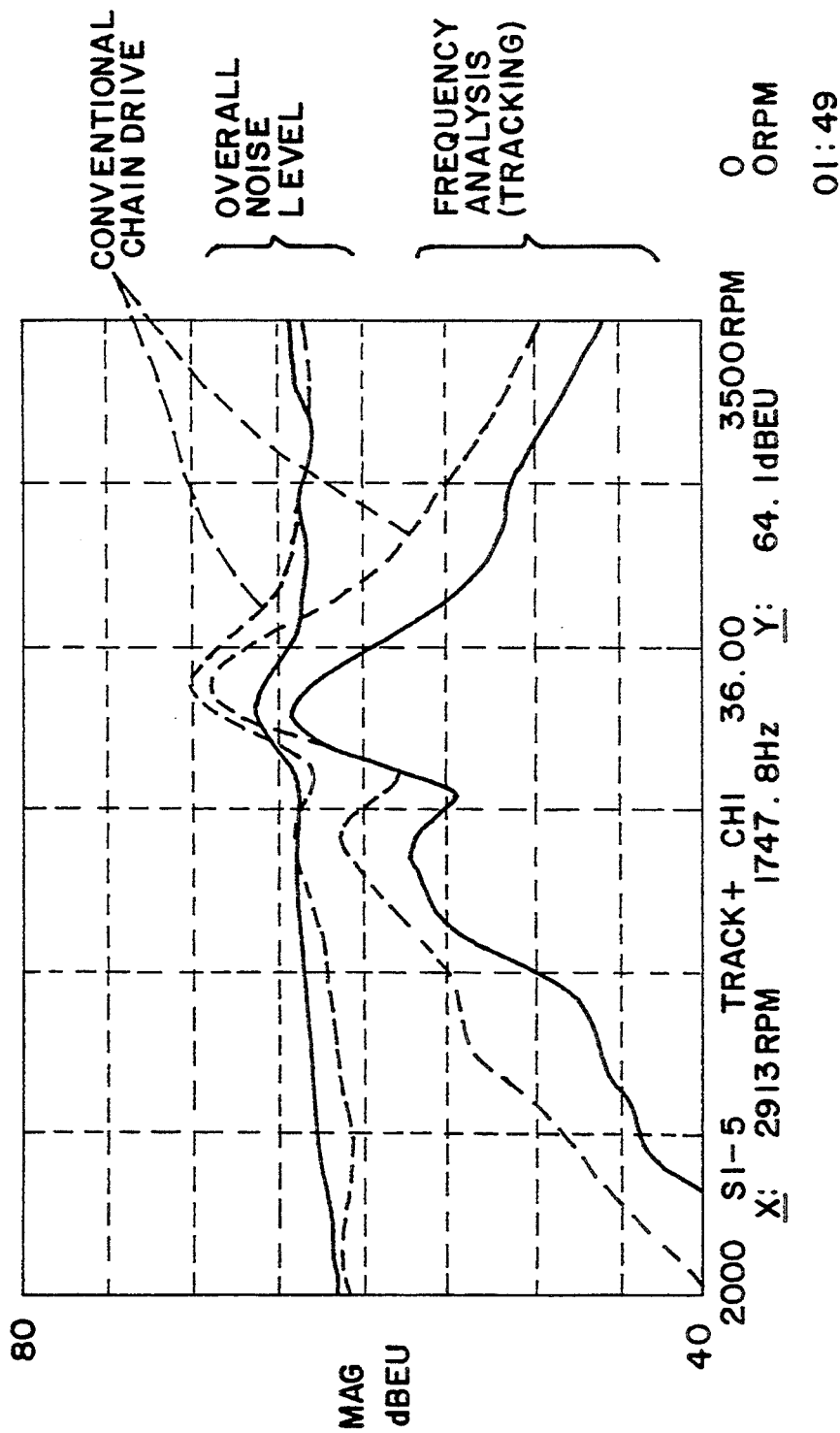
FIG. 12 is a graph comparing noise characteristics between the silent chain drive shown in FIG. 4 and the conventional silent chain drive of FIG. 10.

FIG. 12 is a graph showing the noise characteristics of this embodiment in comparison with those of the conventional chain drive shown in FIG. 10. In FIG. 12, the noise characteristics of this embodiment are depicted by a continuous line. The noise characteristics of the conventional chain drive of FIG. 10 are depicted by a broken line. As clearly shown in this graph, the noise characteristics of this embodiment are improved in terms of both overall noise level and frequency analysis, compared to the conventional drive.

Figure 8:
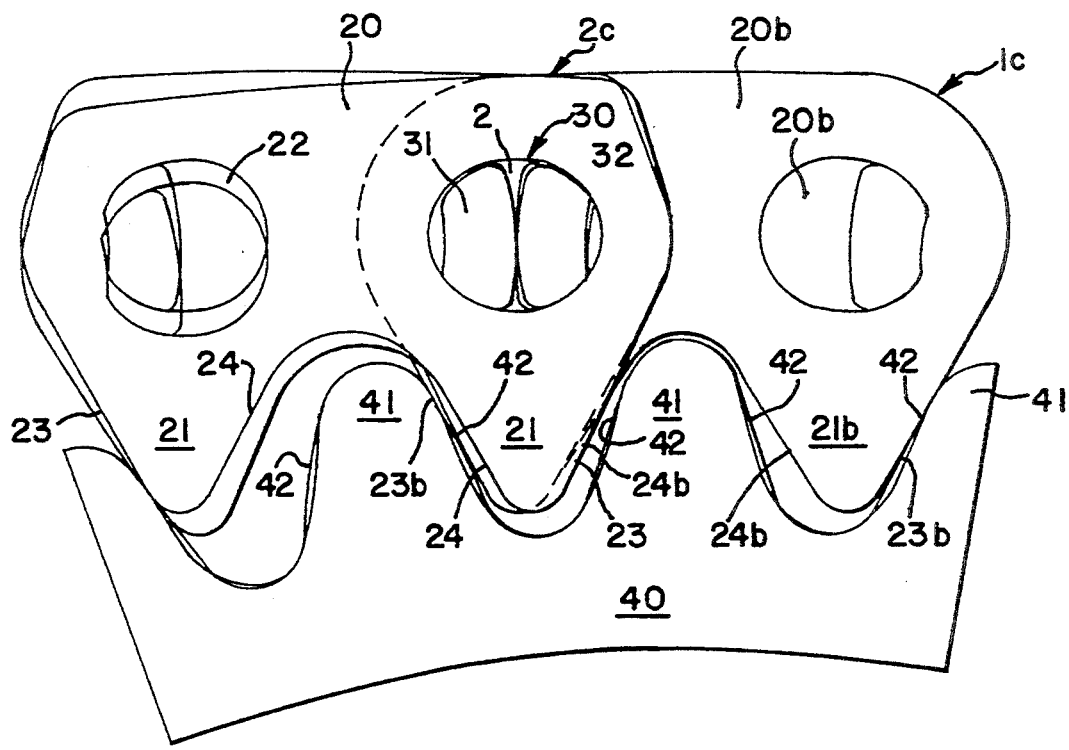
FIG. 8 is a fragmentary enlarged view showing another form of this invention.

FIG. 8 shows a chain drive 1c according to the fifth embodiment of this invention. In this embodiment, a silent chain 2c is constructed by way of randomly arranging the link plate sets consisting of the transversely aligned link plate 20 shown in the first embodiment of FIG. 3 and the link plate sets consisting of the transversely aligned link plates 20b shown in the fourth embodiment of FIG. 7.

Figure 13:
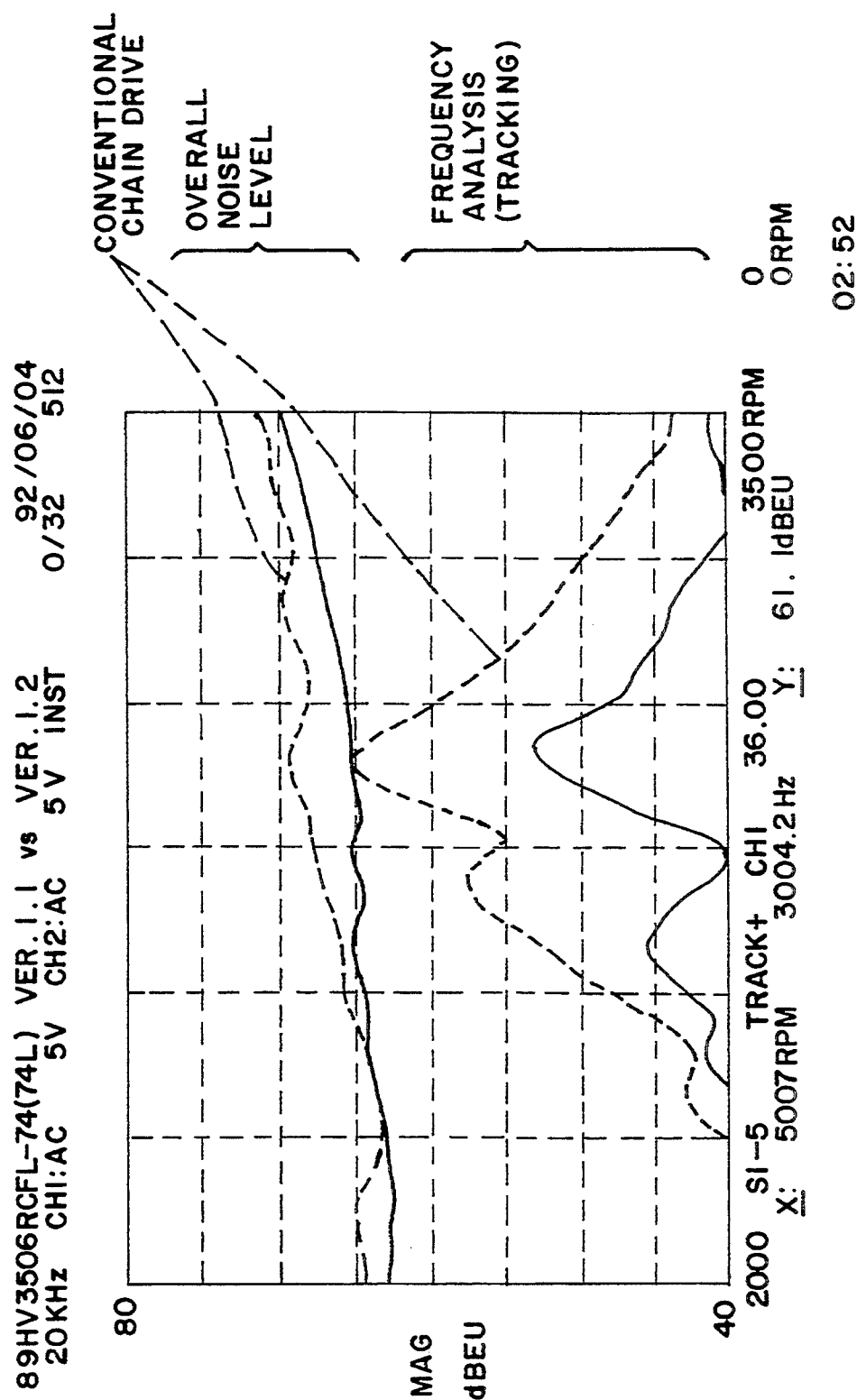
FIG. 13 is a graph comparing noise characteristics between the silent chain drive shown in FIG. 7 and the conventional silent chain drive of FIG. 10.

In addition to easing engagement impacts, this chain drive 1c can make impact timing more randomized. Thus, noise spectra becomes closer to white noise, and the peaks of the pitch noises become lower. FIG. 13 is a graph showing the noise characteristics of this embodiment in comparison with those of the conventional chain drive shown in FIG. 10. In FIG. 13, the noise characteristics of this embodiment are depicted by a continuous line. The noise characteristics of the conventional chain drive of FIG. 10 are depicted by a broken line. As clearly shown in this graph, the noise characteristics of this embodiment are improved in terms of both overall noise level and frequency analysis, compared to the conventional drive.

Other combinations of the above-explained embodiments are also conceivable. One such combination is that the outside flanks in all link plate sets are formed as shown in the first embodiment, and the inside flanks in some link plate sets are formed as shown in the fourth embodiment.

Figure 9:
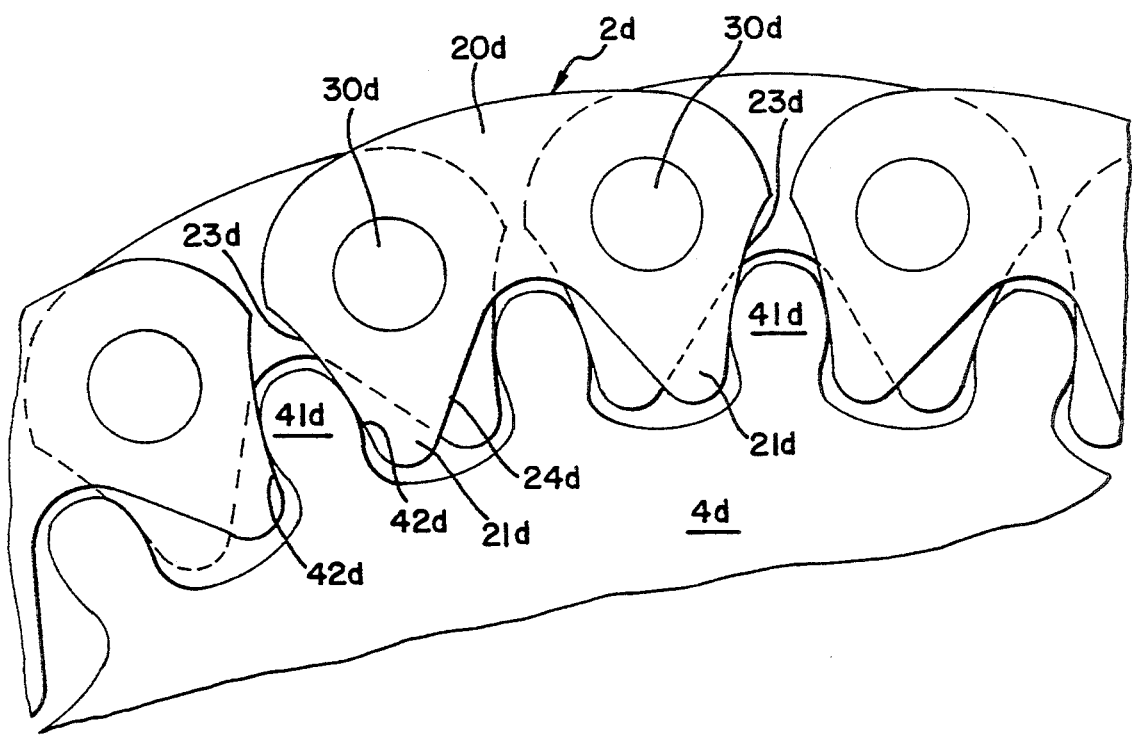
FIG. 9 is a fragmentary enlarged view showing another form of a silent chain with outside flanks of a different profile.

In this embodiment, the outside and inside flanks of the link plates are defined by a straight line configuration and the sprocket tooth flanks of the sprocket teeth are defined by an involute curve configuration. The link plate flanks, however, may be defined by a curved configuration and the sprocket flanks may be defined by a straight line configuration on condition that the above relationship remains the same. For example, as shown in FIG. 9, the outside flanks 23d of the link plates 20d may be defined by a concave configuration. The sprocket teeth 41d may be defined by a configuration shown in FIG. 9.

As has been explained, this invention achieves the effect of easing engagement impacts and lowering noises; the effect is surely assured and undergoes no deterioration with age; and the invention eases stress concentration on link plates and provides a chain drive which endures severe operating conditions.

What is claimed is:

1. A low noise chain drive for use with toothed sprockets having teeth defined by a sprocket tooth flank, the chain comprising:
   a. sets of link plates successively connected for articulation by means of connecting members,
      i. each set having a plurality of transversely aligned link plates with each plate having a pair of openings through which the connecting members are inserted and with each having a pair of link plate teeth designed to engage the sprocket,
      ii. each link plate tooth is defined by an outside flank and an inside flank with at least some of the outside flanks on some of the plates having a portion that projects outwardly from a circle defined by a minimum radius centered upon a rotational axis and osculating the sprocket tooth flank to be meshed with the outside flanks located on the trailing side of the link plate.

2. The chain of claim 1 wherein the plate teeth have a tip and the projecting portion is located adjacent the tip.

3. The chain of claim 2 wherein the projecting portion is a swelling located between the tip and a point on the outside flank that is in contact with the sprocket tooth after the completion of the engagement of the link on the sprocket tooth.

4. The chain of claim 1 wherein the outside flanks and the inside flanks are substantially straight surfaces.

5. The chain of claim 1 wherein the outside flanks have a concave configuration.

6. The chain of claim 1 wherein only one outside flank of each link plate has a projecting portion.

7. The chain of claim 1 wherein each outside flank of each link plate has a projecting portion.

8. The chain of claim 1 wherein the link plates having a projecting portion and the link plates without the projecting portion are randomly arranged.

9. The chain of claim 1 wherein the inside flanks are defined such that a pitch $P_2$ between the inside flanks of two adjacent link plates located in a straight line position of the chain is approximately equal to or greater than a pitch $P_3$ between the inside flanks of the two adjacent link plates located in a chordal position of the chain wound around the sprocket which is approximately equal to or greater than a pitch $P_2$ on a working pitch line between the outside flanks of one link plate.

10. A low noise chain drive comprising
    a. toothed sprockets having sprocket teeth being defined by a sprocket tooth flank; and
    b. an endless silent chain having sets of link plates successively connected for articulation by means of connecting members, i. each set having a plurality of transversely aligned link plates with each plate having a pair of link plate teeth designed to engage the sprocket and having a pair of openings through which connecting members are inserted, ii. each link plate tooth is defined by an outside flank and an inside flank with at least some of the outside flanks having a swelling located between a tip of the link plate tooth and a point that is in contact with the sprocket tooth after the completion of the engagement, the swellings being formed such that when one link plate set rotates around a rotational axis relative to the preceding set having completed engagement with the sprocket, the swellings of the one link plate set project outwardly from a circle defined by the minimum radius centered upon the rotational axis and osculating the sprocket tooth flank to be meshed with the outside flanks located on a trailing side of the one link plate set.

11. A low noise chain drive as recited in claim 10 wherein the inside flanks are defined such that a pitch $P_2$ between the inside flanks of two adjacent link plates located in a straight line position of the chain is approximately equal to or greater than a pitch $P_3$ between the inside flanks of the two adjacent link plates located in a chordal position of the chain wound around the sprocket which is approximately equal to or greater than a pitch $P_1$ on a working pitch line between the outside flanks of one link plate.

12. A low noise chain drive comprising a. toothed sprockets having sprocket teeth being defined by a sprocket tooth flank; and b. an endless silent chain having sets of link plates successively connected for articulation by means of connecting members, i. each set having a plurality of transversely aligned link plates with each having a pair of link plate teeth designed to engage the sprocket and a pair of openings through which connecting members are inserted, ii. each link plate tooth is defined by an outside flank and an inside flank with at least some of the outside flanks in some of the link plate sets having a swelling located between a tip of the link plate tooth and a point being in contact with the sprocket tooth after the completion of the engagement, the swellings being defined such that when one link plate set rotates around a rotational axis relative to the preceding set having completed engagement with the sprocket, the swellings of the one link plate set project outwardly from a circle with a minimum radius centering upon rotational axis and osculating corresponding to the outside flanks located on a trailing side of the one link plate set, iii. the link plate teeth in other link plate sets having outside flanks being defined without the swelling, wherein the link plate sets with the swellings and the other link plate sets without the swellings are arranged randomly in the chain.

13. A low noise chain drive comprising a. toothed sprockets with the sprocket teeth being defined by a sprocket tooth flank; and b. an endless silent chain having sets of link plates successively connected for articulation by means of connecting members, i. each set having a plurality of transversely aligned link plates with each plate a pair of link plate teeth designed to engage a sprocket and having a pair of openings through which connecting members are inserted, ii. the link plate tooth being defined by an outside flank and an outside flank having a swelling located between a tip of the link plate tooth and a point that is in contact with the sprocket tooth after the completion of the engagement, iii. the swellings being formed such that when one link plate set rotates around a rotational axis relative to a preceding set having completed engagement with the sprocket, the swellings of the one link plate set project outwardly from a circle with a minimum radius centering upon the rotational axis and osculating the sprocket tooth flank to be meshed with the outside flanks located on the trailing side of the one link plate set, the inside flanks being defined such that a pitch $P_2$ between the inside flanks of two adjacent link plates located in a straight line position of the chain, a pitch $P_3$ between the inside flanks of the two adjacent link plates located in a chordal position of the chain wound around the sprocket, and a pitch $P_1$ on a working pitch line between the outside flanks of one link plate having the following relationship:

$$P_2 \geq P_1 \geq P_3.$$

14. A low noise chain drive comprising a. toothed sprockets having sprocket teeth being defined by a sprocket tooth flank; and b. an endless silent chain having sets of link plates successively connected for articulation by connecting members, i. each set having a plurality of transversely aligned link plates with each having a pair of link plate teeth designed to engage the sprocket and having a pair of openings through which connecting members are inserted, ii. the link plate tooth being defined by an outside flank and an inside flank, the outside flanks in at least some of the link plate sets having a swelling located between a tip of the link plate tooth and a point being in contact with the sprocket tooth after completion of the engagement, iii. the swellings are defined such that when one link plate set rotates around a rotational axis relative to a preceding set having completed engagement with the sprocket, the swellings of the one link plate set project outwardly from a circle with a minimum radius centering upon a rotational axis and osculating the sprocket tooth flank to be meshed with the outside flanks located on a trailing side of the one link plate set, iv. the link plate teeth in other link plate sets have outside flanks defined without the swelling, v. the link plate sets with the swellings and other link plate sets without the swellings being arranged randomly in the chain, vi. the inside flanks being defined such that a pitch $P_2$ between the inside flanks of two adjacent link plates located in a straight line position of the chain, a pitch $P_3$ between the inside flanks of the two adjacent link plates located in a chordal position of the chain wound around the sprocket, and a pitch $P_1$ on a working pitch line between the outside flanks of one link plate having the following relationship:

$$P_2 \geq P_1 \geq P_3.$$

* * * * *